July 2, 1963 J. H. HAHN 3,096,455

PRINTED DISC ELECTRICAL MACHINERY

Filed March 8, 1962 4 Sheets-Sheet 1

INVENTOR.
James H. Hahn
BY
Kegan, Bellamy & Kegan
Att'ys

July 2, 1963 J. H. HAHN 3,096,455

PRINTED DISC ELECTRICAL MACHINERY

Filed March 8, 1962 4 Sheets-Sheet 2

INVENTOR.
James H. Hahn
BY
Kegan, Bellamy & Kegan
Att'ys

July 2, 1963 J. H. HAHN 3,096,455

PRINTED DISC ELECTRICAL MACHINERY

Filed March 8, 1962 4 Sheets-Sheet 3

INVENTOR
James H. Hahn
by
Kegan, Bellamy & Kegan
Att'ys

July 2, 1963 J. H. HAHN 3,096,455

PRINTED DISC ELECTRICAL MACHINERY

Filed March 8, 1962 4 Sheets-Sheet 4

INVENTOR.
James H. Hahn
BY
Kegan, Bellamy & Kegan
Attys 3,096,455
Patented July 2, 1963

3,096,455

PRINTED DISC ELECTRICAL MACHINERY

James H. Hahn, Glenview, Ill., assignor to Basic Motor Developments, Inc., Tallahassee, Fla., a corporation of Florida Filed Mar. 8, 1962, Ser. No. 179,515
19 Claims. (Cl. 310—268)

This invention relates to rotating electrical machinery and more specifically to such machinery which utilizes a disc-type rotor having a conductive pattern of the printed, plated, etched, or pressure-bonded type.

In accordance with the invention, novel patterns are provided on the disc rotor to provide operating characteristics heretofore unachievable. Basically, the novel pattern for such a disc comprises a conductive winding located on the disc between the center and the circumference thereof so as to define an equal number of magnetic pole centers, each pole center being of opposite polarity with respect to its next adjacent pole center neighbor. Communicating means, preferably in the form of a separate disc adapted for attachment to and rotation with the rotor disc, are provided such that each pole center on the disc is subjected to sequential cycles (relative to each fixed field pole of the stator) of energization in one polarity, short-out, and energization in reverse polarity, according to the angular orientation of the armature poles of the rotor to the fixed field poles of the stator.

By virtue of the minimum of interconnections and cross-overs in the conductive patterns defined by the invention, and concommitant to the usage of a separate commutating disc, it has been found possible to stack a plurality of identical discs in the rotor assembly while utilizing a simple two-brush energization arrangement so as to achieve a multiplication of power conversion, a high, level torque operation, and high efficiency characteristics for the electromechanical device. The patterns are also designed to achieve a maximum utilization of conductive surface on each disc, which feature is likewise enhanced by the provision of separate commutating means and by the minimum of interconnections such that finer printing of the rotor surface conductive pattern may be achieved.

A further feature of the invention resides in a novel disposition of asymmetrical stator magnets on either side of the rotor such that unique and vastly improved operating characteristics are evidenced by an electromechanical energy converter constructed in accordance with the invention.

Printed disc electrical motors and generators have heretofore been described, but no such prior art device is capable of modification to a stacked disc arrangement because of the multiplicity of complex interconnections which would be required in any stacking of the patterns thereof. In fact, in comparison to the instant invention, even a single disc of the heretofore known printed disc electrical machines is subject to the defect of a multiplicity of interconnections from one side of the disc to the other, such that higher fabrication and assembly costs are inherent in the manufacture thereof.

As an improvement over prior art arrangements, the novel stacked disc arrangement herein described is characterized by an angular disposition of each disc of the stacked assembly relative to its next adjacent superposed disc such that each disc in operation is tantamount to an armature pole, in addition to the previously described equal numbered armature pole centers of alternating polarity embodied in the novel pattern of each disc itself.

Accordingly, it is a primary object of this invention to provide a disc type electrical machine having a printed circuit rotor of unique design such that improved operating characteristics are achieved in stacked disc electrical devices.

More specifically, it is an object of this invention to provide such an electrical machine characterized by: high, level torque; high speed; maximum efficiency; simple two-brush commutation such that frictional dissipations are minimized; maximum utilization of conductive patterns on the armature surface; minimum interconnections in the pattern of a single disc and especially in stacked discs whereby fabrication and assembly costs are reduced; high horsepower per weight ratio in a light-weight compact machine having no flywheel effect and having excellent acceleration and deceleration characteristics; substantial uniformity of winding pattern whereby a minimum of vibration is evidenced in operation; self-cooling air draft features; and no-eddy current losses, sparking, or insulation burn-out in the uninsulated printed conductive pattern.

These and other objects, features, and advantages of the subject invention will hereinafter appear, and, for purposes of illustration, but not of limitation, embodiments of the invention are shown in the accompanying drawings, in which.

Figure 2:
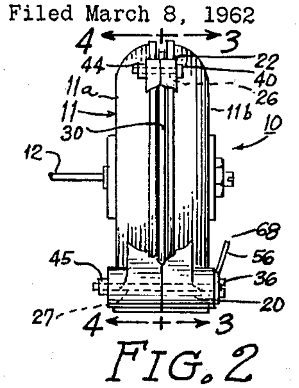
FIG. 2 is a side elevational view of the motor of FIG. 1.

With reference to the drawings, a D.C. motor 10 is illustrated as exemplary of the teachings of this invention. The motor comprises a housing 11 which supports a central shaft 12 rotatably journaled therein as by bearings 14 and 16. The housing 11 comprises two symmetrical disc-shaped hull portions 11*a* and 11*b*, each of which is generally circular in outline and concavely hollow. A base 20 is defined by the offset abutment of the generally rectangular base portions 20*a* and 20*b* of the hull portions 11*a* and 11*b*, respectively. Each hull portion 11*a* and 11*b* is likewise provided with offset flange arms 22*a*, 22*b* respectively and 24*a*, 24*b* respectively, which abut to define the flange connections 22 and 24 respectively. The offset abutment of the flange connections 22 and 24 and of the base portions 20*a* and 20*b* define a peripheral interstice 30 between the hull portions 11*a* and 11*b*, which interstice 30 serves as a self-cooling air draft exhaust for the motor 10, in a manner to be subsequently described.

An aperture 26 in flange connection 22 (defined by aligned apertures 26*a* and 26*b* of flange arms 22*a* and 22*b* respectively) receives a bolt 40-nut 44 assembly; an aperture 28 (not shown) in flange connection 24 (defined by aligned apertures 28*a* and 28*b* of flange arms 24*a* and 24*b* respectively) receives a bolt 42-nut (not shown) assembly; an aperture 27 in base 20 (defined by aligned apertures 27*a* and 27*b* of base portions 20*a* and 20*b* respectively) receives a bolt 36-nut 45 assembly; and an aperture 29 (not shown) in base 20 (defined by aligned apertures 29*a* and 29*b* of base portions 20*a* and 20*b* respectively) receives a bolt 38-nut 46 assembly, whereby the hull portions 11*a* and 11*b* are mounted in spaced adjacency to define the peripheral interstice 30 by the simple four-point interconnection. Additional apertures 50 and 52 are provided in base portion 20*b* adjacent apertures 27*b* and 29*b* thereof respectively.

Terminals 54 and 56 are positioned on the base portion 20*b*, each said terminal having a generally oval outline with two spaced apertures (58, 60 and 62, 64 respectively) and an extending electrical contact finger (66 and 68 respectively). The apertures 58 and 60 of terminal 54 are aligned respectively with apertures 29*b* and 52 of base portion 20*b*, and the apertures 62 and 64 of terminal 56 are aligned respectively with apertures 27*b* and 50 of base portion 20*b*.

On the interior of hull portion 11*b*, L-shaped brush arms 70 and 72, having apertures 74 and 76 respectively, are positioned by alignment of apertures 74 and 76 with apertures 52 and 50 respectively. A hollow rivet 78 connects brush arm 72 with terminal 56 via aperture 50, and a similar hollow rivet 80 connects brush arm 70 with terminal 54 via aperture 52. The brush arms 70 and 72 are formed of a thin, flexible conductive metal (such as copper or brass) and are provided with brushes 82 and 84 respectively, preferably formed of a conventional brush material, such as a sintered copper-lead-graphite admixture. Likewise, the hollow rivets 78 and 80, the terminals 54 and 56, and the bolts 36 and 38 are formed of a conductive material such as copper or brass whereby an electrical lead connected to the terminal 54 either by attachment to the contact finger 66 or by attachment to the bolt 38 on either side of the housing 11 will be electrically connected to brush 82, and similarly an electrical lead analogously connected to terminal 56 will be electrically connected to brush 84.

Figure 5:
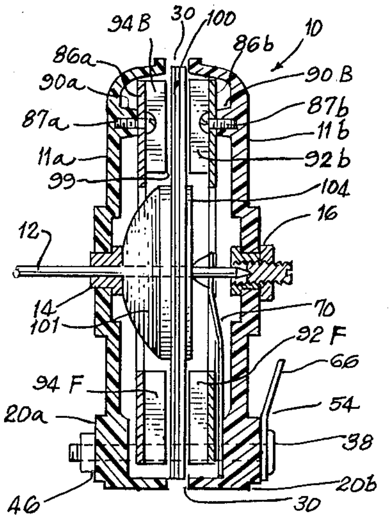
FIG. 5 is also an enlarged sectional view taken along the line 5—5 of FIG. 1.

An annulus 86*b* of ferromagnetic material is mounted on hull portion 11*b*, as by the self-tapping screw attachments 87*b*, 88*b*, and 89*b* into bosses provided in hull portion 11*b* (as, for example, boss 90*b*, see FIG. 5). An equal number of preferably congruous arcuate magnets are mounted on the annulus 86*b*, such as the fixed magnets 92A, 92B, 92C, 92D, 92E, 92F in the described embodiment (see FIG. 3). The magnets are symmetrically positioned on the annulus 86*b* and are arranged such that each adjacent magnet is of opposite polarity with respect to its next adjacent neighbor. Thus, as in FIG. 3, magnets 92A, 92C, and 92E will have north poles closest to the annulus 86*b*, whereas magnets 92B, 92D, and 92F will have south poles closest to the annulus 86*b*. Obviously, the ferromagnetic annulus 86*b* serves as a magnetic flux path for the retained magnets.

Figure 4:
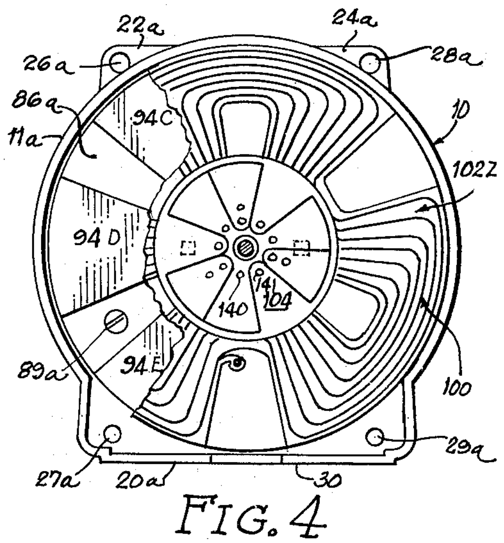
FIG. 4 is a similar view taken along the line 4—4 of FIG. 2, with the printed disc armature assembly being partially cut away in order to show the asymmetry of the stator magnets.

Similarly, an annulus 86*a* is mounted on the hull portion 11*a*, as by the corresponding screw attachments 87*a*, 89*a*, and 88*a* (the latter not being shown), and correspondingly magnets 94A, 94B, 94C, 94D, 94E, and 94F (magnet 94A not being shown in the partially cut-away view of FIG. 4 or in FIG. 5) are mounted on the annulus 86*a* in symmetrical positions of alternate polarity. Also, the magnets 94A–F are oriented such that the pattern of alternate polarity is staggered with respect to the magnets 92A–F (i.e., magnet 94D has a north pole closest to the annulus 86A, whereas the corresponding magnet 92D has a south pole closest to the annulus 86*b*), whereby a series of flux paths of alternating direction across the air gap 99 between the aligned magnets is obtained.

The shaft 12, which as previously described is rotatably journaled in bearings 14 and 16, carries the rotor assembly 100, which comprises a sandwiched assembly of printed circuit discs 102 and a commutator disc 104. A conical bearing 101 is also located on the shaft 12 such that the stacked printed disc assembly 102 is positioned within the air gap 99, the commutator disc 104 bears against the brushes 82 and 84, and the conical bearing 101 bears against the bearing 14, as seen in FIG. 5.

Any suitable material may be chosen for construction of the motor housing 11. A light-weight, rigid plastic such as cast epoxy or polyformaldehyde has been found particularly suitable. Likewise, a suitable material for conical bearing 101 has been found to be hardened steel.

Figure 1:
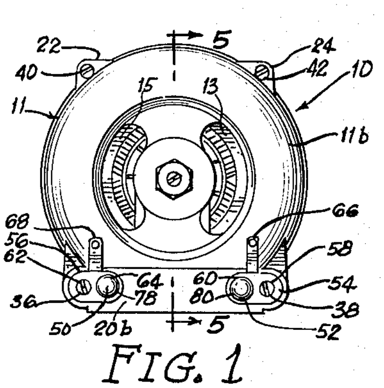
FIG. 1 is a front elevational view of a direct-current electric motor constructed in accordance with the teachings of this invention.
Figure 3:
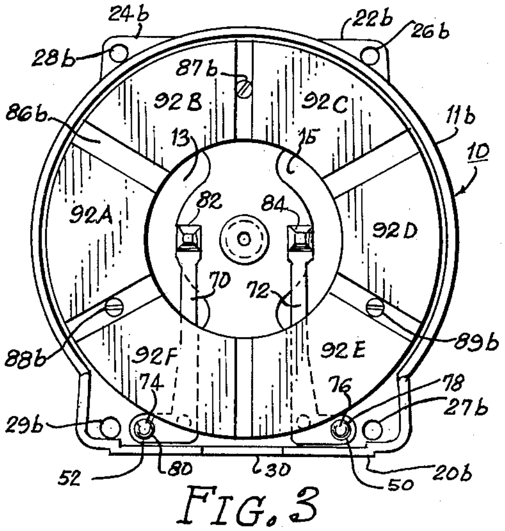
FIG. 3 is an enlarged sectional view taken along the line 3—3 of FIG. 2.

Preferably, each hull portion 11*a* and 11*b* is provided with air duct openings, such as the openings 13 and 15 of hull portion 11*b*, as seen in FIGS. 1 and 3. When the rotor assembly 100 is in operation, as will be hereinafter described, a forced air draft will be maintained from the described air duct openings through the air gap 99 and out of the interstice 30 such that the motor will evidence self-cooling operational characteristics.

Figure 12:
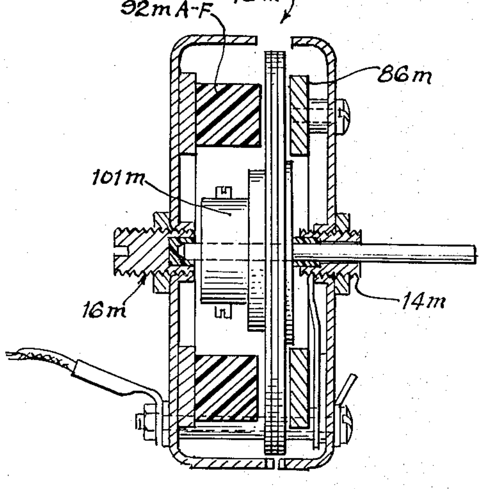
FIG. 12 is a view similar to FIG. 5 of a modified form of a D.C. electric motor utilizing magnets on one side of the rotor and an armature return ring on the other.

An alternate embodiment of the motor is shown in FIG. 12, wherein a motor 10*m*, generally corresponding to the motor 10 of FIG. 1, is shown. In this embodiment, the spaced hull portions are asymmetrical, and magnets 92*m*A–F are provided on only one side of the rotor assembly. An armature return ring 86*m* is utilized on the other side of the rotor assembly to complete the flux path, instead of the magnets 94A–F, as in the FIG. 1 embodiment. Likewise, slightly different bearings 14*m*, 16*m*, and 101*m* (as compared to the bearings 14, 16, and 101 of the FIG. 1 embodiment) are provided, but obviously these merely structural variations in no way affect the operation of the motor 10*m* as compared to the motor 10 of FIG. 1.

The particular choice of size and number of magnets and of magnetic material chosen depends upon a variety of factors, with which a practitioner in the art is readily acquainted. Thus, the fixed stator field magnets may be provided by conventional electromagnets or may be of the permanent magnet variety, such as a conventional Alnico magnet, for instance. However, it is preferred to utilize a permanent type magnet formed of a sintered ferrite ceramic or a ferrite-rubber matrix, which is conventionally bonded to the annulus flux path, as seen in FIGS. 3 and 4. The ferrite-rubber matrix type magnets are especially desirable in that they contribute to the light-weight characteristics of the motor and are particularly suited for utilization with an air gap sufficiently wide to accommodate a plurality of printed rotor discs.

Moreover, it has been found that unexcelled operating characteristics are achieved by providing magnets on both sides of the rotor assembly and by unbalancing the respective sizes thereof. Thus, in the preferred embodiment illustrated in FIGS. 3 and 4, the magnets 92A–F in hull portion 11*b*, while each congruous relative to one another, are respectively larger (measured by the polar angle subtended by the arcuate magnet segments) than the corresponding magnets 94A–F. This asymmetrical disposition of arcuate magnets has been found to afford superior results as compared to either a balanced arrangement of magnets on both sides of the rotor or an unbalanced arrangement of magnets on one side with an armature return ring on the other (as in the FIG. 12 embodiment).

While it should be understood that this feature of the invention is not to be bound to any particular theory of operation, the following explanation may indicate the source of the unexpected benefits of operating characteristics: It seems likely that the described asymmetrical arrangement diverts the flux lines from a pure perpendicular disposition so as to concentrate a greater number of flux lines per unit area at the pole centers of each magnet. Since the motor operation may be analyzed in terms of the torque produced when the pole centers of the electromagnetic fields of the rotor attempt to line up with the corresponding pole centers of the magnetic fields of the stator (as hereinafter described), the effective increase in flux line density at the stator pole centers creates a greater tendency for rotor-stator pole center alignment.

The sandwiched printed disc assembly 102 of the rotor 100 comprises a plurality of stacked discs 102X, 102Y, and 102Z, mutually separated by insulating diaphragms 107 and each comprising an insulating member 103 having a winding pattern 105 of a conductive metal such as copper, printed, plated, etched, or pressure-bonded thereon in a conventional manner. Each insulating member 103 is preferably a phenolic resin disc, a polyester sheet film, or a woven cloth fiberglass, such that the absence of magnetic material in the rotor obviates eddy losses in the energy conversion process. Each insulating diaphragm 107 is preferably a high dielectric constant paper. Typical dimensions of the component units are as follows:

| | Inches |
|---|---|
| Thickness of insulating member 103 | 0.005–0.008 |
| Thickness of insulating diaphragm 107 | 0.002–0.004 |
| Thickness of winding pattern 105 | 0.004–0.007 |
| Diameter of apertures in insulating member 103 | About 0.03 |

The apertures in the insulating member 103 serve to lead current from one side of the disc to the other; accordingly, they may be plated with the same conductive metal as is the winding pattern 105, or separate conductive links such as metallic rivets may be inserted in the respective apertures.

The essential geometrical characteristic of the winding pattern 105 is that it is located on the insulating member between the center and the circumference thereof so as to define an equal number of magnetic pole centers, each pole center being of opposite polarity with respect to its next adjacent neighbor.

The term "pole center" as utilized herein is intended to define for purposes of illustration a convention whereby a given point may represent the net magnetic field of the immediately surrounding area, whether in an electromagnetically induced field or in a permanent type magnetic field.

Figure 8:
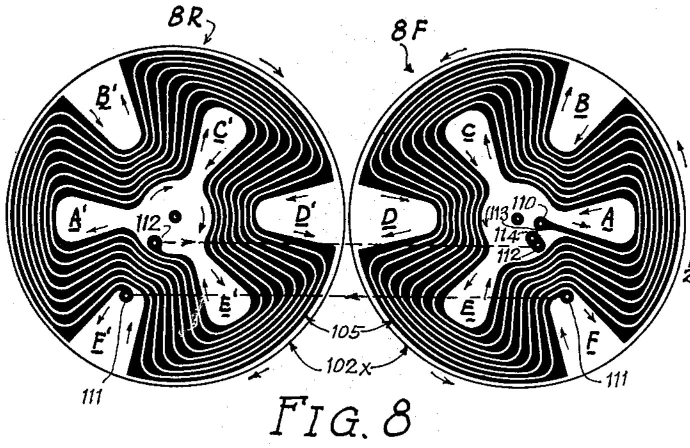
FIG. 8 is an unfolded plan view of one form of a printed disc armature capable of use in the motor of FIG. 1, 8F being the front of the disc and 8R being the rear thereof, with the electrical connections therebetween being indicated by phantom lines.

In the FIG. 8 embodiment (designed for use with the six-pole motor described in FIG. 1), the winding 105 traverses a plurality of generally U-shaped paths, each defined by a first substantially radial leg, a second substantially radial leg, and a substantially arcuate leg joining the radial legs, such that a magnetic pole center is defined within the saddle portion of each of the generally U-shaped paths.

For purposes of illustration, assume a conventional positive current flow from the aperture 110 in FIG. 8 radially outwardly on side 8F of the disc 102X, as indicated by the arrows in FIG. 8. The current will follow the convoluted path through a series of six generally U-shaped paths A, B, C, D, E, and F per 360 degrees of surface area, until the aperture 111 is reached. The aperture 111 electrically connects to the side 8R (either by virtue of being plated through or via a conductive rivet, as previously described), as indicated by the phantom line in FIG. 8. The current then follows a generally similar path on the side 8R, traversing the generally U-shaped paths A′, B′, C′, D′, E′, and F′, until the aperture 112 is reached. The aperture 112 connects back to the side 8F, and current then follows the conductive path 113 to the aperture 114. It should be apparent that an appropriate potential impressed across the open circuit defined by the apertures 110–114 will cause a current flow as just described.

Each of the generally U-shaped paths traversed by this current flow essentially resembles a planar coil in effect, and thus an electromagnetic field having a pole center within the saddle portion of that U-shaped portion is induced. Since the direction of current flow reverses relative to the said saddle portion of each adjacent U-shaped path, each pole center is of opposite polarity with respect to its next adjacent neighbor. That is, if the current flow through winding 105 is such that a north pole is produced within the saddle portion of the U-shaped path A, then a south pole will be produced within the saddle portions of the U-shaped paths B and F, and so on around the circle. Moreover, by virtue of the essential symmetry of the pattern 105 on both sides 8F and 8R, the current flow at any given point on one side is in the same direction as the current flow at any corresponding point on the other side, whereby both portions of the winding contribute to the magnetic induction even though they are separated by the insulating member 103.

Figure 10:
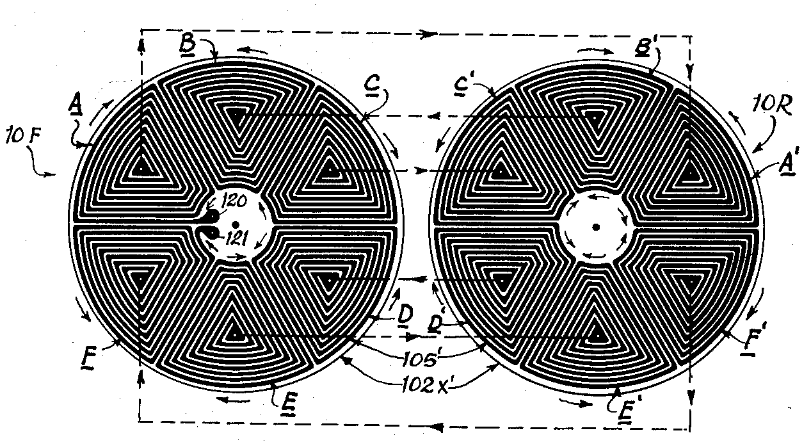
FIG. 10 is a similar unfolded view of an alternate form of printed disc armature, 10F being the front of the disc and 10R being the rear thereof.

Similarly, in the FIG. 10 embodiment, the winding 105′ traverses a plurality of convoluted paths, each defined by an outermost portion convoluting inwardly to an innermost portion, such that a pole center is defined within the confines of the convoluted path.

More specifically, assume a conventional positive current flow from the aperture 120 in FIG. 10 radially outwardly on the side 10F of the disc 102X′, as indicated by the arrows in FIG. 10. The current will follow the convoluted whorl of path A, spiraling inwardly to the innermost extreme thereof, at which point an aperture is located. The aperture electrically connects to the side 10R (as indicated by the phantom line in FIG. 10) and thus to the innermost extreme of the whorl A′ on the side 10R. The current then follows the convoluted whorl A′, spiraling outwardly to the outermost extreme thereof, which merges into the outermost extreme of the next adjacent whorl B′, from which point it spirals inwardly to the innermost extreme of the whorl B′, at which point an aperture is located. The aperture electrically connects to the side 10F (as indicated by the phantom line) and thus to the innermost extreme of the whorl B on the side 10F. The current then follows the convoluted whorl B, spiraling outwardly to the outermost extreme thereof, which merges into the outermost extreme of the next adjacent whorl C, from which point it spirals inwardly to the innermost extreme of the whorl C, at which point an aperture is located. The aperture electrically connects to the side 10R (as indicated by the phantom line) and thus to the innermost extreme of the whorl C′ on the side 10R. The current then follows the convoluted whorl C′, spiraling outwardly to the outermost extreme thereof, which merges into the outermost extreme of the next adjacent whorl D′, from which point it spirals inwardly to the innermost extreme of the whorl D′, at which point an aperture is located. The aperture electrically connects to the side 10F (as indicated by the phantom line) and thus to the innermost extreme of the whorl D on the side 10F. The current then follows the convoluted whorl D, spiraling outwardly to the outermost extreme thereof, which merges into the outermost extreme of the next adjacent whorl E, from which point it spirals inwardly to the innermost extreme of the whorl E, at which point an aperture is located. The aperture electrically connects to the side 10R (as indicated by the phantom line) and thus to the innermost extreme of the whorl E′ on the side 10R. The current then follows the convoluted whorl E′, spiraling outwardly to the outermost extreme thereof, which merges into the outermost extreme of the next adjacent whorl F′, from which point it spirals inwardly to the innermost extreme of the whorl F′, at which point an aperture is located. The aperture electrically connects to the side 10F (as indicated by the phantom line) and thus to the innermost extreme of the whorl F on the side 10F. The current then follows the convoluted whorl F, spiraling outwardly to the outermost extreme thereof, which terminates at the aperture 121. Obviously, an appropriate potential impressed across the apertures 120—121 will cause current flow as just described.

Thus, in the FIG. 8 embodiment, two connecting apertures (100 and 114) and two transferring apertures (111 and 112) are described, and likewise in the FIG. 10 embodiment, two connecting apertures (120 and 121) and six transferring apertures (one each located at the innermost extremes of each of the spirals A–F) are described, whereby a minimum of interconnections from one side of the disc to the other are required.

In operation, the aforementioned potential across the apertures 110–114 for the disc 102X of FIG. 8 or across the apertures 120—121 for disc 102X′ of FIG. 10 is supplied by means of a commutator-brush assembly. As previously mentioned, the commutating means preferably comprise a separate disc such that maximum utilization of the surface area between the center and the circumference of each rotor disc may be achieved. Likewise, the employment of a separate commutator disc facilitates the stacking of a plurality of discs, in a manner to be subsequently described.

Figure 9:
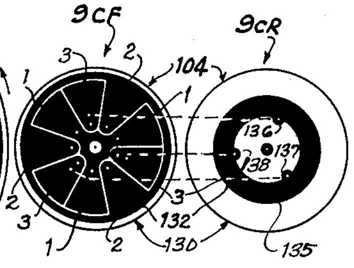
FIG. 9 is a similar unfolded view of one form of a commutator suitable for use with the printed disc shown in FIG. 8, 9CF being the front of the disc and 9CR being the rear thereof.
Figure 11:
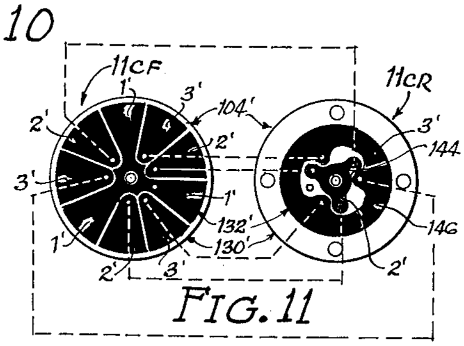
FIG. 11 is a similar unfolded view of another form of commutator, generally corresponding to that shown in FIG. 9, 11CF being the front of the disc and 11CR being the rear thereof.

FIGS. 9 and 11 disclose operative embodiments of commutator discs suitable for use with either of the rotor discs shown in FIGS. 8 and 10. In general, the commutator disc corresponds physically to the rotor discs, but are, as illustrated, of smaller diameter. Each disc (104 in FIG. 9 and 104′ in FIG. 11) comprises an insulating member 130 and 130′ respectively having a conductive pattern 132 and 132′ respectively of a conductive metal such as copper, printed, plated, etched, or pressure-bonded thereon in a conventional manner.

In the FIG. 9 embodiment, the pattern 132 comprises three mutually insulated conductive regions 1, 2, and 3. These regions are defined by the division of side 9CF into nine generally arcuate segments, three of which comprising region 1 are mutually interconnected around the center of the commutator disc 104, three of which comprising region 2 are mutually interconnected around the circumference of the commutator disc 104, and the remaining three of which comprising region 3 are mutually interconnected by the annular belt 135 on the side 9CR of commutator disc 104, the apertures 136, 137, and 138 providing an electrical connection from side 9CF to side 9CR, as indicated by the phantom lines in FIG. 9.

Each of the nine generally arcuate segments is provided with a connecting aperture, indicated by the circular row of nine white dots on side 9CF in FIG. 9. Obviously, these connecting apertures are spaced 40° apart (360° divided by the number of arcuate segments). Therefore, since the apertures 110–114 of disc 102X of FIG. 8 and the apertures 120—121 of disc 102X′ of FIG. 10 are likewise spaced 40° apart, the commutator disc 104 can be aligned with either rotor disc such that two adjacent connecting apertures of the commutator disc are superposed over the 40° spaced apertures of the rotor disc. Conductive rivets, such as the rivets 140 and 141 seen in FIG. 4, may then be utilized to maintain the commutator disc 104 in fixed, superposed relationship with respect to a rotor disc. Obviously, additional discs may be added to the described stacked assembly of one rotor disc and one commutator disc by positioning the 40° spaced apart apertures of such additional discs in alignment with the 40° spaced apart apertures of the commutator disc and by fastening the additional discs to the described assembly with additional rivets, analogously to the rivets 140 and 141 connection.

Figure 6:
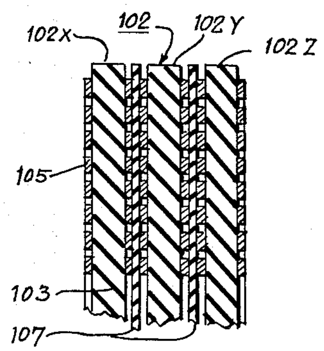
FIG. 6 is an enlarged fragmentary view in section of the stacked disc armature assembly shown in FIG. 5.

An insulating member, such as the paper diaphragm 107 shown in FIG. 6, is utilized to separate the commutator disc from the stacked rotor discs in the same fashion that the stacked rotor discs are mutually separated from each other.

Similarly, in the FIG. 11 commutator embodiment, pattern 132′ comprises three mutually insulated conductive regions 1′, 2′, and 3′. These regions are defined by the division of the side 11CF into nine generally arcuate segments, three of which comprising region 1′, are mutually interconnected around the center of the commutator disc 104′, three of which comprising region 2′ are mutually interconnected by the generally clover-leaf portion 144 on the side 11CR of commutator disc 104′, and the remaining three of which comprising region 3′ are mutually interconnected by the generally annular belt 146 on the side 11CR of commutator disc 104′, suitable apertures being provided to define electrical connections from side 11CF to side 11CR, as indicated by the phantom lines in FIG. 11.

Figure 7:
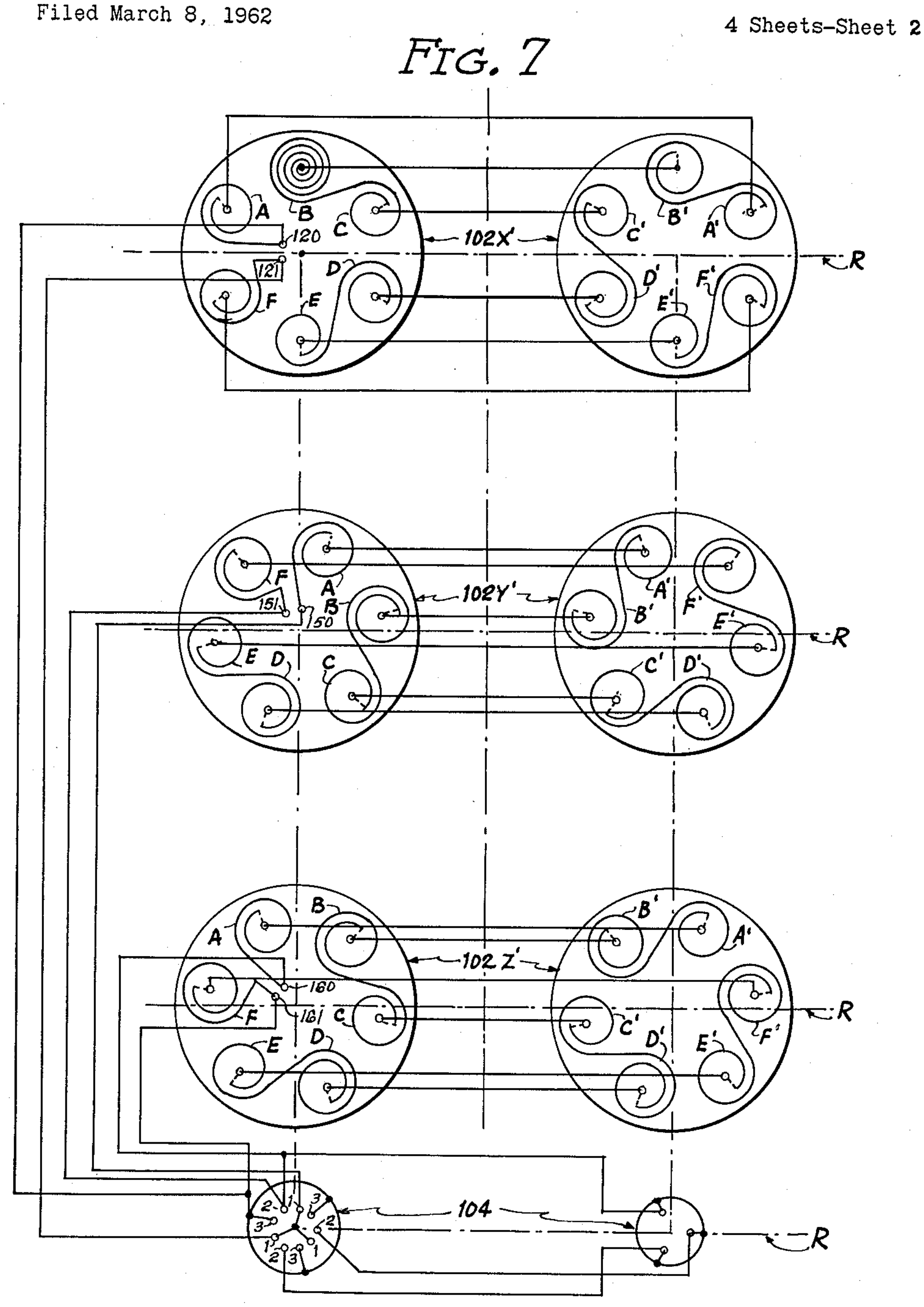
FIG. 7 is a schematic circuit diagram of a three-disc stacked assembly utilizing the printed circuit shown in FIG. 10 and the commutator shown in FIG. 9.

For purposes of illustrating the operation of a D.C. motor utilizing the novel components hereinbefore described, it is assumed that a commutator disc 104 such as is shown in FIG. 9 is affixed to three discs 102X′, 102Y′, and 102Z′ of the type shown in FIG. 10. The discs 102X′, 102Y′, and 102Z′ have transferring apertures 120—121, 150—151, and 160—161, respectively, and are angularly oriented, as shown in FIG. 7, such that the aperture 150 is 80° clockwise from the aperture 120, while the aperture 160 is 40° clockwise from the aperture 120. This angular relationship means that apertures 120 and 161 are 40° clockwise from aperture 121, apertures 151 and 160 are 80° clockwise from aperture 121, and aperture 150 is 120° clockwise from aperture 121. The commutator disc 104 is superposed on the three stacked rotor discs by aligning four adjacent transferring apertures of the commutator disc 104 with the corresponding apertures 120; 121 and 161; 151 and 160; and 150. Four conductive rivets are then inserted through those apertures to fix the described relative disposition. Thus, the angular relationship of the three stacked discs is that of a 20° relative disposition, that is, the center of any given spiral of any given disc is 20° from the center of the closest spirals on one of the other discs, as seen in FIG. 7.

As shown by the equivalent electrical circuit in FIG. 7 (wherein the innermost extreme of each spiral is schematically represented by the pole center for that spiral), the above-described relationship means that aperture 121 of disc 102X′ is electrically connected to region 1 of commutator disc 104, whereas aperture 120 of disc 102X′ is electrically connected to region 3 of commutator disc 104. Similarly, aperture 150 of disc 102Y′ is electrically connected to region 1 and aperture 151 of disc 102Y′ is electrically connected to region 2, whereas aperture 160 of disc 102Z′ is electrically connected to region 2 and aperture 161 of disc 102Z′ is electrically connected to region 3.

Thus, the commutator disc 104 serves as an electrical conduit for the stacked discs by the indicated interconnections of the commutator connecting apertures to the respective rotor disc connecting apertures such that a minimum number of apertures are required on each rotor disc and a maximum utilization of pattern printing on each rotor disc surface may be achieved.

When the riveted assembly of stacked discs 102X′, 102Y′, and 102Z′ and attached commutator disc 104 is mounted on a shaft 12 and inserted in a motor housing 11, similar to that shown in FIG. 5, the 180° spaced brushes 82 and 84 bear against the front (i.e., 9CF of FIG. 9) of the commutator disc 104. The 180° spacing of the brushes 82 and 84 is equivalent to a 60° spacing of the brushes in the described embodiment, since every point on the surface of the commutator disc 104 is electrically equivalent to a corresponding point at a 120° angular disposition.

The concentric stacking of the discs 102X', 102Y', and 102Z', in the described angular relationship provides eighteen pole centers (six on each of the three stacked discs) each 20° angularly disposed with respect to its next adjacent neighbor when the three stacked discs are viewed in superposed plan view.

To appreciate the functioning of the apparatus, the following assumptions are made: Assume that the radial lines separating the arcuate segments comprising the regions 1, 2, and 3 of commutator disc 104 are infinitesimally narrow and that the brushes 82 and 84 are likewise of infinitesimal width just slightly in excess of the width of the said radial lines. Assume that the rotor assembly is placed beneath the brushes 82 and 84 such that a radial line separating two adjacent regions 3 and 1 is beneath brush 84. Obviously, this relationship means that the center of a region 2 180° away will be beneath the brush 82.

Assume further that the disc 102X' in FIG. 7 is aligned with a set of six stator magnets 92A'–F' such that the respective pole centers of each of the spirals A–F of disc 102X' directly align with the respective pole centers of the six stator magnets. Assume further that the brushes 84 and 82 are centrally located on the reference line R of FIG. 7. Also, assume that the magnet 92B' (the pole center of which, along with the pole center of spiral B of disc 102X', is 90° from the reference line R) has its south pole closest to the stacked rotor disc assembly (the remaining magnets 92A' and C'–F' alternating in polarity and the magnets 94A'–F' on the other side of the stacked discs being staggered and alternating in polarity as previously indicated in the description of the magnets 92A–F and 94A–F shown in FIGS. 3 and 4). The foregoing assumptions of spatial relationship depart slightly from that shown in FIG. 3, that is, if the magnets 92A–F of FIG. 3 were rotated 30° clockwise, the assumed positions for brushes 82 and 84 relative to the magnets 92A–F would be achieved.

Finally, assume a positive current flow from brush 84 to brush 82 and the following arbitrary right-hand rule for electromagnetic induction: When positive current flows in a planar convolution, the thumb of the right hand will point to the induced north pole when the index finger of the same hand is perpendicular to the thumb and is pointing in the direction of positive current flow.

On the foregoing assumptions, the following instantaneous phenomena will be evidenced: Disc 102X' will be shorted out since the apertures 120 and 121 thereof are electrically connected respectively to regions 3 and 1, which are shorted by the by the brush 84 overlapping the regions 3 and 1.

Disc 102Y' will receive positive current at aperture 150, which is electrically connected to region 1, which in turn receives positive current from brush 84, and will exhaust positive current at aperture 151, which is electrically connected to region 2, which in turn exhaust positive current to brush 82. Therefore, spiral A of disc 102Y' will have a north pole below the plane of FIG. 7 and a south pole above the plane of FIG. 7, in accordance with the assumed right-hand rule.

Disc 102X' will receive positive current at aperture 161, which is electrically connected to region 3, which in turn receives positive current from brush 84, and will exhaust positive current at aperture 160, which is electrically connected to region 2, which in turn exhausts positive current to brush 82. In other words, disc 102Z' will be connected in parallel with disc 102Y', via the described brush-commutator contact. Spiral A of disc 102Y' will have a south pole below the plane of FIG. 7 and a north pole above the plane of FIG. 7, in accordance with the assumed right-hand rule.

The rotor assembly will rotate clockwise, since the south pole of spiral A of disc 102Y' will be repulsed by the south pole of the assumed stator magnet 92B' and also since the north pole of the spiral A of disc 102Z' will be attracted by the same south pole of magnet 92B', spiral B of disc 102X', directly beneath the magnet 92B', being shorted out and therefore magnetically unaffected by the magnet 92B'.

For simplicity, the foregoing description has specifically referred to only one of the six stator magnets (i.e., 92B') and to the three closest spirals, one of each disc (i.e., spiral B of disc 102X', spiral A of disc 102Y', and spiral A of disc 102Z') in order to explain the indicated clockwise rotation. However, it will be apparent to one skilled in the art that further tracing of the circuitry of FIG. 7 will indicate the corresponding phenomena with respect to each of the stator magnets and to all of the spirals of each disc.

After the rotor assembly has rotated clockwise by an infinitesimal angle, brush 84 will be wholly within region 1 (since, as seen in FIG. 9 and in FIG. 7, a region 1 is counterclockwise of the next closest region 3) and brush 82 will still remain in region 2. At this point, disc 102Y' is energized exactly as in the assumed starting conditions, that is, by a positive brush contacting region 1 and a negative brush contacting region 2. Disc 102Z', however, is no longer energized by a positive brush contacting region 3 and a negative brush contacting region 2, since brush 84 has cleared region 3 by the described rotation. But, in fact, disc 102X' and 102Z' will be energized in series with each other and in parallel with disc 102Y' as follows: Positive current will flow from brush 84 via region 1 to aperture 121 of disc 102X', through the pattern thereon, out to aperture 120 thereof, and via region 3 of commutator disc 104 to aperture 161 of disc 102Z', through the pattern thereon, out to aperture 160 thereof, and finally back to brush 82 via region 2 of commutator disc 104 in contact therewith. Therefore, disc 102Z' is energized in a corresponding manner to the assumed starting conditions, and disc 102X' is now also energized. The spiral A of disc 102X' will have a south pole above the plane of FIG. 7 and will correspondingly aid in the induced clockwise rotation. Of course, only one-half the voltage is impressed across disc 102Z', as compared to the initial starting conditions, same fashion as previously described, whereas disc 102X' in series with disc 102Z', such that the net effect is the same (i.e., twice as many induced magnetic fields, each of one-half intensity).

The above-described conditions of all three discs being energized so as to cause clockwise rotation will continue until 20° of clockwise rotation have taken place. At this point, the brush 84 will be positioned in the center of region 1 and the brush 82 will be positioned over the radial line separating regions 2 and 3 (i.e., 180° away). At this point disc 102Z', the pole centers of which are now aligned with the pole centers of stator magnets, will be shorted out since the brush 82 overlaps regions 2 and 3. Disc 102Y' will continue to be energized in the same fashion as previously described, whereas disc 102X' will now be energized in parallel therewith by the positive brush contacting region 1 and the negative brush contacting region 3. Clockwise rotation will therefore continue as the magnetic fields of the armature react to line up with the magnetic fields of the stator.

After the rotor assembly has rotated clockwise by an infinitesimal angle, brush 84 will remain wholly within region 1 and brush 82 will be wholly within region 3. At this point, disc 102X' will remain energized by the positive-at-region 1—negative-at-region 3 potential, and discs 102Y' and 102Z' will become energized in series-parallel therewith as follows: Positive current from brush 84 will flow via region 1 of commutator disc 104 to aperture 150 of disc 102Y′, through the pattern thereon, out to aperture 151 thereof, and via region 2 of commutator disc 104 to aperture 160 of disc 102Z′, through the pattern thereon, to aperture 161 thereof, and finally back to brush 82 via region 3 of commutator disc 104 in contact therewith. Thus, the current flow through disc 102Y′ remains the same but the current flow through disc 102Z′ is reversed, whereby the induced magnetic fields thereof are likewise reversed, under the assumed right-hand rule. Clockwise rotation will still continue, however, as the spiral A of disc 102Z′ now provides a south pole above the plane of FIG. 7 and is repelled by the south pole of the assumed stator magnet 92B′.

It will be apparent to one skilled in the art that the foregoing analysis may be continued for a full 360° of revolution and that clockwise revolution will be continuously induced. In fact Table I presents the instantaneous data recorded by such a continuing analysis for 120° of rotation. In the table, the symbol S indicates that the disc is shorted out; the symbol F indicates that the disc is energized by the full potential across the brushes 84—82; the symbol H indicates that the disc is energized by one-half of that potential; the symbol + indicates that that energization is in one given direction; and the symbol − indicates that the energization is opposite of the given direction.

Accordingly, in general terms, it will be realized: (1) that a first given disc experiences (*a*) an instantaneous short-out when the pole centers thereof align with the pole centers of the stator magnets; (*b*) energization in one direction for 60° of rotation thereafter; (*c*) another instantaneous short-out as the pole centers again align; and (*d*) energization in a reverse direction for the next 60° of rotation in the same continued direction; (2) that a second disc experiences the exact same sequence of energization in one direction for 60°, short-out, and energization in reverse direction for another 60°, but in a 20° phased relationship with the first said disc; and (3) that a third disc similarly experiences the exact same energization, short-out, and energization sequence, but in a 40° phased relationship with the first said disc.

In different words, two discs in parallel will tend to cause rotation while a third disc is instantaneously shorted out, each one of the three discs instantaneously shorting out and reversing polarities in sequence at every 20° of angular rotation, and three discs, two in series-parallel with the third, will tend to cause the same rotation in the interval between each 20° phased short-out. In effect, the described motor operates as if each separate disc were an armature pole, notwithstanding the disposition of an equal number of armature poles on each disc corresponding in number to the number of stator magnets utilized.

Obviously, one of the assumptions utilized to describe the operation of the motor is not in consonance with reality, namely, that the radial lines separating the arcuate segments comprising the regions 1, 2, and 3 are infinitesimally narrow and that the brushes 82 and 84 are likewise of infinitesimal width just slightly in excess of the width of the said radial lines. In any practical embodiment, the indicated radial lines have a finite width and of course the brushes have a finite area. This attribute of actual physical embodiments produces a slightly different operation since a brush continues to overlap two adjacent regions for a period longer than the aforementioned infinitesimal angle of rotation. For example, assume that the brushes 82 and 84 are positioned in the housing 11 such that each subtends a maximum polar angle infinitesimally less than 20°, the remaining assumptions of the foregoing description being unchanged.

In such a case, the brush 84 will continue to overlap regions 1 and 2 (the brush 82 remaining wholly within region 2) until 10° of rotation have been accomplished. Only at the instantaneous moment of 10° rotation do the two brushes lie wholly within a given region (i.e., brush 84 in region 1 and brush 82 in region 2). Rotation by an infinitesimal angle thereafter will retain brush 84 wholly within region 1 but will cause brush 82 to overlap regions 2 and 3. A corresponding analysis of motor operation under the assumed conditions of finite brush point contact will yield the data produced in Table II.

Comparison of Tables I and II indicates the following: An infinitesimal brush point contact exhibits an instantaneous characteristic (A), wherein one disc is shorted out with the remaining two discs operating on full voltage in parallel, followed by 20° of characteristic (B), wherein all three discs are operating, one at full voltage and the remaining two at half voltage in series-parallel relation, the general sequence of instantaneous (A) followed by 20° of (B) repeating every 20° in a phased relationship. Likewise, a finite brush point contact (subtending a maximum polar angle infinitestimally less than 20°) exhibits an instantaneous (B) followed by 20° of (A), again in a sequential 20° phased relationship.

Any choice of brush size which falls between the two assumed conditions of Tables I and II, that is, a brush of finite width which subtends a maximum polar angle less than 20°, will exhibit a combination of both operations, that is, $x$° of (A) followed by $(20-x)$° of (B) per 20° of sequential rotation. The only limitation on brush size is that the brushes may not subtend polar angles of more than 20° (for if they do, both brushes will contact the same region of the commutator and thus short out the entire motor). Accordingly, one may vary the brush size and position between the indicated extremes, smaller brushes placed closer to the periphery tending to subtend a smaller polar angle and vice versa. Other considerations, however, such as the frictional effects of brush size and position, may influence the most preferable design in a given situation.

It has been found that a motor identical with that previously described, utilizing only two stacked discs instead of three, performs almost as well as the three-disc motor, at an obvious cost saving. Accordingly, as a preferred embodiment of the invention, only two discs such as the discs 102X′ and 102Y′ of FIG. 7 are stacked in the rotor assembly (i.e. the third disc 102Z′ is removed from the rotor assembly).

Tables III and IV (corresponding respectively to Tables I and II) are presented to show the operating data of such a two-disc motor. It should be noted that a slightly different phased relation is thus defined in that one of the two discs is periodically open-circuited (as indicated by the symbol OC, see, for instance, the 10° of rotation position in Table IV). Thus, when the brush contact is across regions 1 and 2, disc 102X′, apertures 120 and 121 of which are respectively connected to regions 3 and 1, is open-circuited. However, so far as the magnetically induced motor is concerned, an open-circuited disc is of course equivalent to a short-circuited disc, such that an operative sequence of disc shorting and reversible energization is achieved, as indicated in Tables III and IV.

In the preferred embodiment of the invention only two discs are utilized, as just described, with one disc staggered relative to the other by the minimum angle which insures positive starting. This angle may range from greater than 0° up to 30° for the described six pole armature discs, with a 20° or less angular disposition being preferred.

Figure 13:
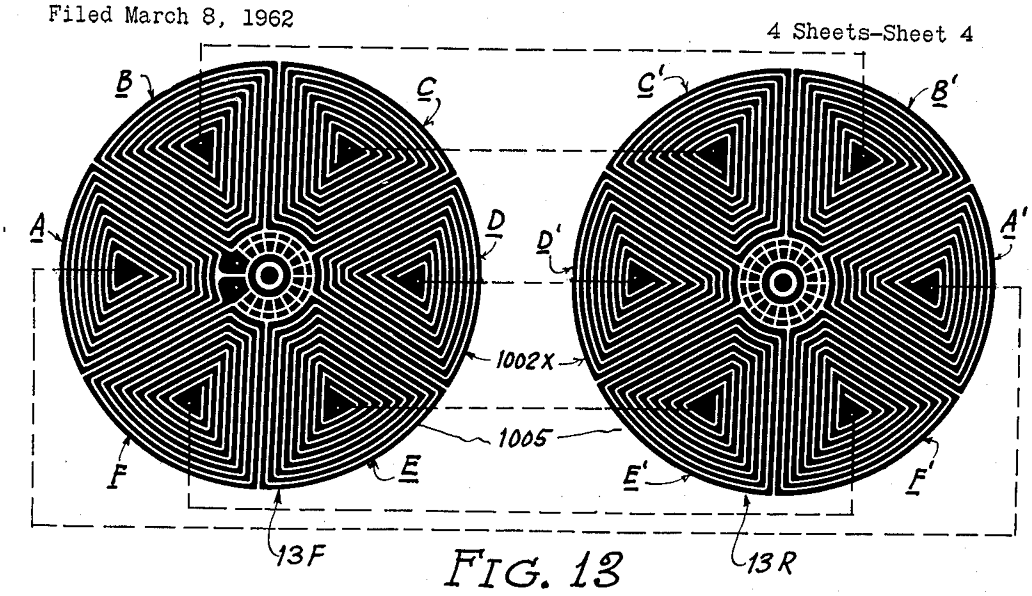
FIG. 13 is a view similar to FIG. 10, showing a preferred form of printed disc armature, 13F being the front of the disc and 13R being the rear thereof.
Figure 14:
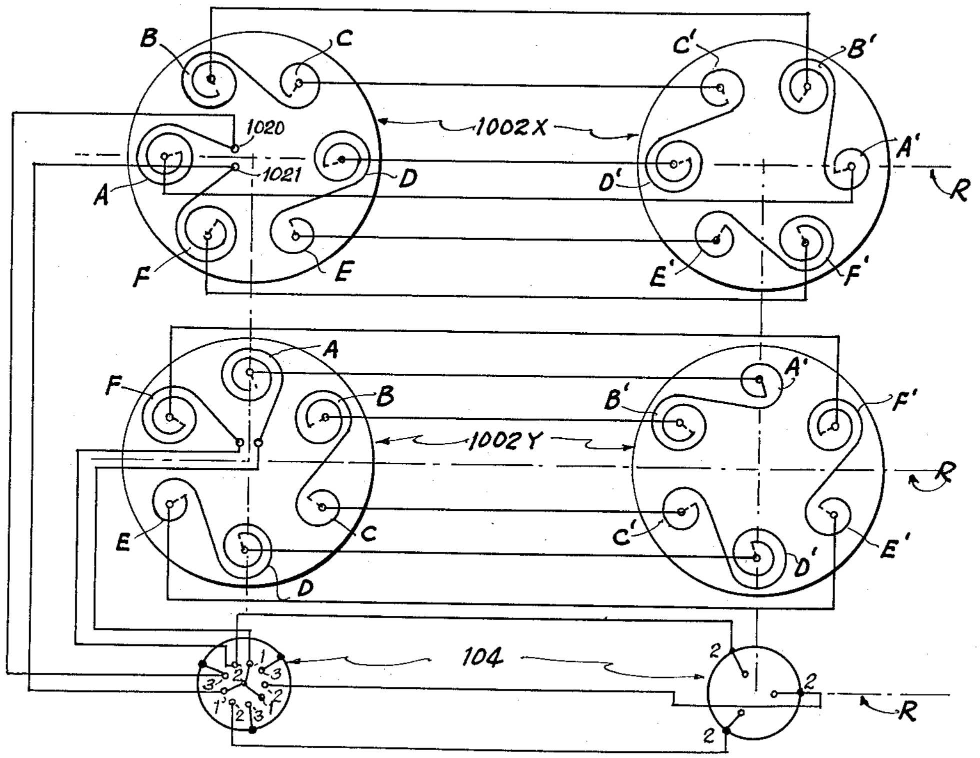
FIG. 14 is a schematic circuit diagram similar to FIG. 7, showing the preferred arrangement of a two-disc stacked assembly utilizing the printed circuit shown in FIG. 13 and the commutator shown in FIG. 9.

In FIG. 14, discs 1002X and 1002Y are shown at a 30° relative disposition. Discs 1002X and 1002Y are of the type shown in FIG. 13, which is a preferred modification of the FIG. 10 disc embodiment.

Disc 1002X is essentially similar to disc 102X′ of FIG. 10 and differs in only two particulars.

First, the apertures 1020 and 1021 thereof (as indicated in FIG. 14), which correspond to the apertures 120 and 121 of disc 102X′, are rotated by 30° with respect to the pattern on the disc, that is, whereas apertures 120 and 121 are located 40° apart and each 10° from the respective innermost extremes of two adjacent spirals (e.g. A and F in FIG. 10), apertures 1020 and 1021 are also located 40° apart, but each are 20° from the innermost extreme of a given spiral (e.g. A in FIG. 13). This modification can be readily achieved since the connecting apertures of a given disc may be placed anywhere on the disc surface in the central portion not occupied by the winding pattern by appropriate variations in the length or curvatures of the outermost portions of the spirals A and F of a given disc.

Second, as seen in FIG. 13, the central portion of the disc 1002X (between the center and the pattern 1005 thereon) is provided with printed conductive metal which is insulated from the pattern 1005. This additional pattern of printed metal in the center of the disc serves no electrical purpose, but facilitates uniform plating and in addition mechanically balances the distribution of metal on the surface of the disc 1002 so as to obviate any wobbling or vibration effects which might otherwise be induced.

As shown in the equivalent electrical circuit diagram of FIG. 14, a commutator disc 104 is connected to the discs 1002X and 1002Y by conductive rivets, in the same manner as previously described with reference to FIG. 7, but the commutator disc 104 is also shifted 30° relative to the winding pattern 1005 of disc 1002X (whereby an alignment of connecting apertures of the rotor disc to connecting apertures of the commutator disc may be achieved which is equivalent to the FIG. 7 relative disposition).

For purposes of illustrating the functioning of the apparatus, assume that the pole centers of six stator magnets are aligned with the pole centers of spirals A–F of disc 1002X, all the other assumptions made relative to the FIG. 7 operation remaining constant. Such a condition of assumed spatial relationships will result in the brush to stator magnet relation shown in FIG. 3.

On the foregoing assumptions, instantaneous phenomena will be evidenced for both infinitesimal brush point contact and for finite brush point contact, and in fact exactly the same data as is shown in Tables III and IV will be observed.

A motor constructed with two rotor discs such as 1002X and 1002Y staggered at a 30° relative disposition (i.e. FIG. 14) will operate in the same fashion as described with reference to a motor constructed with two rotor discs such as 102X' and 102Y' staggered at a 20° relative disposition (i.e. FIG. 7), since, as shown by the equivalent data in Tables III and IV, each disc experiences a short-out every 60° with alternate energization therebetween and the short-out sequence for the two discs can be viewed as if phased by 30°. Thus, disc 1002X is shorted out, at 0°, 60°, 120°, and 180° etc. whereas disc 1002Y is shorted out at 30°, 90°, 150°, etc. (since an open-circuited disc is magnetically equivalent to a short-circuited disc).

A motor utilizing only one printed disc in the rotor assembly could also be constructed and would operate in the same general fashion as heretofore described. However, such a motor would ordinarily depend upon inertia in order to pull through those positions in which the conductive winding of the disc is shorted out (or equivalently open-circuited) and likewise would not necessarily be self-starting. Accordingly, it is preferred to utilize a plurality of staggered stacked discs, each resembling an integral armature pole as heretofore described, such that continuous self-starting operation is achieved, and such that power multiplication, high-level torque, and high efficiency characteristics are evidenced.

However, it should be apparent that even a one disc rotor assembly can be constructed by appropriate shifting of the pattern on one face of the disc relative to the pattern on the other face of the disc, that is, by staggering rather than aligning the respective portions of the winding pattern on either face of the disc. In effect, such a variation would be tantamount to a two-disc self starting motor, each portion of the winding pattern on each face of the one disc being equivalent to a separate disc per se.

From the foregoing descriptions of the several embodiments, a geometrical relationship of commutator to rotor disc for a motor having an equal number of stator poles and likewise an equal number of armature poles can be generalized as follows: for $n$ armature poles symmetrically positioned at $360°/n$ there must be $\frac{3}{2}n$ commutator segments symmetrically positioned at $\frac{2}{3}(360/n)°$. A practitioner in the art, in view of the detailed teachings herein and in view of the foregoing generalization, will be able to provide numerous practical embodiments of the invention by variations in brush size and position, stator magnet number and location, rotor disc pattern, position of rotor disc connecting apertures relative to the rotor disc pattern, number of rotor discs employed and their relative angular disposition, and commutator pattern and location.

It should be understood that various changes and modifications of the invention may be made in the details of construction, arrangements, operations, and materials for the various elements without departing from the spirit and the scope of the instant invention, especially as defined in the appended claims.

TABLE I

*Infinitesimal Brush Point Contact—Three Disc Motor*

| Angular rotation in degrees | Region of commutator disc contacted by brush | | Disc | | |
|---|---|---|---|---|---|
| | 84 | 82 | 102X' | 102Y' | 102Z' |
| 0 | 1—3 | 2 | S | F+ | F+ |
| | 1 | 2 | H+ | F+ | H+ |
| 20 | 1 | 2—3 | F+ | F+ | S |
| | 1 | 3 | F+ | H+ | H− |
| 40 | 1—2 | 3 | F+ | S | F− |
| | 2 | 3 | H+ | H− | F− |
| 60 | 2 | 3—1 | S | F− | F− |
| | 2 | 1 | H− | F− | H− |
| 80 | 2—3 | 1 | F− | F− | S |
| | 3 | 1 | F− | H− | H+ |
| 100 | 3 | 1—2 | F− | S | F+ |
| | 3 | 2 | H− | H+ | F+ |
| 120 | 3—1 | 2 | S | F+ | F+ |

TABLE II

*Finite Brush Point Contact (Subtending a Polar Angle Infinitesimally Less Than 20°)—Three Disc Motor*

| Angular rotation in degrees | Region of commutator disc contacted by brush | | Disc | | |
|---|---|---|---|---|---|
| | 84 | 82 | 102X' | 102Y' | 102Z' |
| 0 | 1—3 | 2 | S | F+ | F+ |
| | 1—3 | 2 | S | F+ | F+ |
| 10 | 1 | 2 | H+ | F+ | H+ |
| | 1 | 2—3 | F+ | F+ | S |
| 20 | 1 | 2—3 | F+ | F+ | S |
| | 1 | 2—3 | F+ | F+ | S |
| 30 | 1 | 3 | F+ | H+ | H− |
| | 1—2 | 3 | F+ | S | F− |
| 40 | 1—2 | 3 | F+ | S | F− |
| | 1—2 | 3 | F+ | S | F− |
| 50 | 2 | 3 | H+ | H− | F− |
| | 2 | 3—1 | S | F− | F− |
| 60 | 2 | 3—1 | S | F− | F− |
| | 2 | 3—1 | S | F− | F− |
| 70 | 2 | 1 | H− | F− | H− |
| | 2—3 | 1 | F− | F− | S |
| 80 | 2—3 | 1 | F− | F− | S |
| | 2—3 | 1 | F− | F− | S |
| 90 | 3 | 1 | F− | H− | H+ |
| | 3 | 1—2 | F− | S | F+ |
| 100 | 3 | 1—2 | F− | S | F+ |
| | 3 | 1—2 | F− | S | F+ |
| 110 | 3 | 2 | H− | H+ | F+ |
| | 3—1 | 2 | S | F+ | F+ |
| 120 | 3—1 | 2 | S | F+ | F+ |

TABLE III

*Two Disc Analogue of Table I*

| Angular rotation in degrees | Region of commutator disc contacted by brush | | Disc | |
|---|---|---|---|---|
| | 84 | 82 | 20° relative disposition 102X′, 30° relative disposition 1002X | 20° relative disposition 102Y′, 30° relative disposition 1002Y |
| 0 | 1—3 | 2 | S | F+ |
| | 1 | 2 | OC | F+ |
| 20 | 1 | 2—3 | F+ | F+ |
| | 1 | 3 | F+ | OC |
| 40 | 1—2 | 3 | F+ | S |
| | 2 | 3 | H+ | H− |
| 60 | 2 | 3—1 | S | F− |
| | 2 | 1 | OC | F− |
| 80 | 2—3 | 1 | F− | F− |
| | 3 | 1 | F− | OC |
| 100 | 3 | 1—2 | F− | S |
| | 3 | 2 | H− | H+ |
| 120 | 3—1 | 2 | S | F+ |
| | 1 | 2 | OC | F+ |
| 140 | 1 | 2—3 | F+ | F+ |
| | 1 | 3 | F+ | OC |
| 160 | 1—2 | 3 | F+ | S |
| | 2 | 3 | H+ | H− |
| 180 | 2 | 3—1 | S | F− |

TABLE IV

*Two Disc Analogue of Table II*

| Angular rotation in degrees | Region of commutator disc contacted by brush | | Disc | |
|---|---|---|---|---|
| | 84 | 82 | 20° relative disposition 102X′, 30° relative disposition 1002X | 20° relative disposition 102Y′, 30° relative disposition 1002Y |
| 0 | 1—3 | 2 | S | F+ |
| | 1—3 | 2 | S | F+ |
| 10 | 1 | 2 | OC | F+ |
| | 1 | 2—3 | F+ | F+ |
| 20 | 1 | 2—3 | F+ | F+ |
| | 1 | 2—3 | F+ | F+ |
| 30 | 1 | 3 | F+ | OC |
| | 1—2 | 3 | F+ | S |
| 40 | 1—2 | 3 | F+ | S |
| | 1—2 | 3 | F+ | S |
| 50 | 2 | 3 | H+ | H− |
| | 2 | 3—1 | S | F− |
| 60 | 2 | 3—1 | S | F− |
| | 2 | 3—1 | S | F− |
| 70 | 2 | 1 | OC | F− |
| | 2—3 | 1 | F− | F− |
| 80 | 2—3 | 1 | F− | F− |
| | 2—3 | 1 | F− | F− |
| 90 | 3 | 1 | F− | OC |
| | 3 | 1—2 | F− | S |
| 100 | 3 | 1—2 | F− | S |
| | 3 | 1—2 | F− | S |
| 110 | 3 | 2 | H− | H+ |
| | 3—1 | 2 | S | F+ |
| 120 | 3—1 | 2 | S | F+ |

What is claimed is:

1. A commutator device for use with a rotating printed disc armature having $n$ even poles comprising:
   an insulating member having a centrally located aperture and having a conductive pattern located thereon,
   said pattern comprising $3n/2$ circular wedge segments, each adjacent segment being mutually insulated and the said segments being symmetrically positioned at $⅔(360/n)°$.

2. A commutator device for use with a rotating printed disc armature comprising:
   an insulating member having a centrally located aperture and having a conductive pattern coated thereon,
   said pattern comprising nine spoke aligned segments subtending 40° each, every third such segment being electrically connected to define three mutually insulated conductive paths.

3. A commutator device as claimed in claim 2, wherein three of said segments are electrically connected via a conductive path around the center of the disc on one side thereof; three other of said segments are electrically connected via a conductive path around the circumference of the disc on the same side thereof; and the three remaining of said segments are electrically connected via a conductive path located on the other side of the disc.

4. A commutator device as claimed in claim 2, wherein three of said segments are electrically connected via a conductive path around the center of the disc on one side thereof; three other of said segments are electrically connected via a conductive path located on the other side of the disc; and the three remaining of said segments are electrically connected via a second conductive path located on the other side of the disc.

5. A conductive rotor assembly for an electromechanical energy converter comprising:
   first insulating means having a circular cross-section and having a first conductive pattern located thereon,
   said first pattern comprising an open-circuited conductive winding located on said first insulating means between the center and the circumference thereof to define an equal number of $n$ pole centers, each pole center being of opposite polarity with respect to its next adjacent pole center neighbor and being symmetrically positioned therefrom at $(360/n)°$;
   second insulating means concentrically associated with the said first insulating means and having a second conductive pattern located thereon,
   said second pattern comprising $3n/2$ circular wedge segments, each adjacent segment being mutually insulated and the said segments being symmetrically positioned at $⅔(360/n)°$; and
   means connecting said first insulating means and said second insulating means such that two pole centers located within $2(360/n)°$ of said first insulating means are aligned with three wedge segments located within $2(360/n)°$ of said second insulating means,
   wherein the said conductive winding of the first pattern is open-circuited across respective ends of that winding positioned at $⅔(360/n)°$ from each other and the said connecting means electrically connect two mutually insulated adjacent segments of the second pattern respectively to the said ends.

6. A conductive device as claimed in claim 5 and further comprising:
   third insulating means concentrically associated with the said first insulating means and having a conductive pattern thereon identical to the said first pattern; and
   means connecting said third insulating means and said second insulating means such that two pole centers located within $2(360/n)°$ of said third insulating means are aligned with three other wedge segments located within $2(360/n)°$ of said second insulating means and electrically connecting two other mutually insulated adjacent segments of the second pattern respectively to the open-circuited ends of the third insulating means.

7. A rotor assembly for an electromechanical energy converter comprising:
   two insulating members each having a centrally located aperture for fixedly mounting the members on a rotatable shaft and each having a conductive pattern located thereon,
   said members being in superposed alignment such that the centrally located apertures thereof are coincident,
   each pattern on each member comprising an open-circuited conductive winding located on the member between the center and the circumference thereof to define six pole centers, each pole center being of opposite polarity with respect to its next adjacent pole center neighbor,
   said pole centers of one member being non-coincident with the pole centers of the other member,
   each pattern traversing six convoluted paths, each defined by an outermost portion convoluting inwardly to an innermost portion, such that a pole center is defined within the confines of each convoluted path, the said convoluted paths being located in adjacent non-overlapping sectors of the insulating member and each comprising a continuous spiral, the direction of the spiral in each conductive path being identical, each conductive winding being open-circuited between the outermost portions of two adjacent conductive paths, and the innermost portions of the two said adjacent conductive paths each being electrically connected to the innermost portion of a conductive path next adjacent thereto;

a third insulating member having a centrally located aperture in superposed alignment with the aligned centrally located apertures of the said two insulating members and having a conductive commutator pattern located thereon, the said commutator pattern comprising nine circular wedge segments, each adjacent segment being mutually insulated and the said segments being symmetrically positioned at 40°; and conductive links electrically connecting the said outermost portions of two adjacent conductive paths of each conductive winding respectively to mutually insulated segments of the said commutator pattern.

8. A conductive rotor assembly for an electromechanical energy converter comprising:

a plurality of insulating members each having a centrally located aperture and each having a conductive pattern located thereon, said members being in superposed alignment such that the centrally located apertures thereof are coincident, each pattern on each member comprising an open-circuited conductive winding located on the member between the center and the circumference thereof to define an equal number of pole centers, each pole center being of opposite polarity with respect to its next adjacent pole center neighbor, and said pole centers of each member being non-coincident with the pole centers of any other members, each pattern traversing a plurality of convoluted paths, each defined by an outermost portion convoluting inwardly to an innermost portion, such that a pole center is defined within the confines of each convoluted path, the said convoluted paths being located in adjacent non-overlapping sectors of the insulating member and each comprising a continuous spiral, the direction of the spiral in each conductive path being identical, each conductive winding being open-circuited between the outermost portions of two adjacent conductive paths, and the innermost portions of the two said adjacent conductive paths each being electrically connected to the innermost portion of a conductive path next adjacent thereto; and commutating means which comprise:

an insulating member having a centrally located aperture in superposed alignment with the aligned centrally located apertures of the said plurality of insulating members and having a conductive commutator pattern located thereon, the said commutator pattern comprising $3n/2$ circular wedge segments, each adjacent segment being mutually insulated and the said segments being symmetrically positioned at $\frac{2}{3}(360/n)°$, wherein $n$ equals the said equal number of pole centers and wherein means electrically connect the said outermost portions of two adjacent conductive paths respectively to adjacent mutually insulated segments of the said commutator pattern.

9. A conductive rotor assembly as claimed in claim 8, wherein the said plurality of insulating members comprises three insulating members each having six pole centers, wherein the pole centers of each member are each disposed at 20° with respect to the closest pole centers of any other member.

10. A conductive rotor assembly as claimed in claim 8, wherein the said plurality of insulating members comprises two insulating members each having six pole centers, wherein the pole centers of each member are each disposed at 20° with respect to the closest pole centers of the other member.

11. An electromechanical energy converter comprising:

a housing;

a shaft rotatably journaled within the housing;

means providing magnetic flux paths annularly disposed with respect to the shaft, the said paths comprising an equal number of magnetic pole centers, each pole center being of opposite polarity with respect to its next adjacent pole center neighbor; and a rotor assembly adapted for rotation with the shaft comprising:

a plurality of superposed insulating disc members each co-axial with the shaft and each having a conductive pattern located thereon, each pattern on each member comprising an open-circuited conductive winding located on the member between the center and the circumference thereof to define an equal number of pole centers, each pole center being of opposite polarity with respect to its next adjacent pole center neighbor, and said pole centers of each member being non-coincident with the pole centers of any other members, each pattern traversing a plurality of convoluted paths, each defined by an outermost portion convoluting inwardly toward an innermost portion, such that a pole center is defined within the confines of each convoluted path, the said convoluted paths being located in adjacent non-overlapping sectors of the insulating member, and each comprising a continuous spiral, the direction of the spiral in each conductive path being identical, each conductive winding being open-circuited between the outermost portion of two adjacent conductive paths, and the innermost portions of the two said adjacent conductive paths each being electrically connected to the innermost portion of a conductive path next adjacent thereto; and commutating means, wherein the pole centers of each member are each disposed at 20° with respect to the closest pole centers of another member.

12. An electromechanical energy converter as claimed in claim 11, which comprises an even number of insulating members.

13. An electromechanical energy converter as claimed in claim 12, which comprises two insulating members each having six pole centers.

14. An electromechanical energy converter as claimed in claim 11 which comprises an odd number of insulating members.

15. An electromechanical energy converter as claimed in claim 14, which comprises three insulating members each having six pole centers.

16. An electromechanical energy converter as claimed in claim 11, wherein the said commutating means comprises:

an insulating member co-axially disposed with the said plurality of superposed insulating discs and having a conductive commutator pattern located thereon, the said commutator pattern comprising $\frac{3}{2}n$ circular wedge segments, each adjacent segment being mutually insulated and the said segments being symmetrically positioned at $\frac{2}{3}(360/n)°$, wherein $n$ equals the said equal number of pole centers;

means electrically connecting the said outermost portions of two adjacent conductive paths respectively to adjacent segments of the said commutator pattern; and brush means adapted to bear against the commutator pattern located on the insulating member.

17. An electromechanical energy converter as claimed in claim 11 wherein said rotor assembly comprises:

two insulating members each having a centrally located aperture for fixedly mounting the members on a rotatable shaft and each having a conductive pattern located thereon, said members being in superposed alignment such that the centrally located apertures thereof are coincident;

each pattern on each member comprising an open circuited conductive winding located on the member between the center and the circumference thereof to define six pole centers, each pole center being of opposite polarity with respect to its next adjacent pole center neighbor, said pole centers of one member being non-coincident with the pole centers of the other member, each pattern traversing six convoluted paths, each defined by an outermost portion convoluting inwardly to an innermost portion, such that a pole center is defined within the confines of each convoluted path, the said convoluted paths being located in adjacent non-overlapping sectors of the insulating member and each comprising a continuous spiral, the direction of the spiral in each conductive path being identical, each conductive winding being open-circuited between the outermost portions of two adjacent conductive paths, and the innermost portions of the two said adjacent conductive paths being electrically connected to the innermost portion of a conductive path next adjacent thereto;

a third insulating member having a centrally located aperture in superposed alignment with the aligned centrally located apertures of the two said insulating members and having a conductive commutator pattern located thereon, the said commutator pattern comprising nine circular wedge segments, each adjacent segment being mutually insulated and the said segments being symmetrically positioned at 40°;

conductive links electrically connecting the said outermost portions of two adjacent conductive paths of each conductive winding respectively to mutually insulated segments of the said commutator pattern; and brush means adapted to bear against the commutator pattern located on the third insulating member.

18. An electromechanical energy converter comprising:

a housing;

a shaft rotatably journaled in the housing;

means providing magnetic flux paths annularly disposed with respect to the shaft, the said paths comprising an equal number of magnetic pole centers, each pole center being of oppositely polarity with respect to its next adjacent pole center neighbor; and a rotor assembly adapted for rotation with the shaft comprising:

a plurality of superposed insulating discs each co-axial with the shaft and each having a conductive pattern located thereon, each pattern on each member comprising an open-circuited conductive winding located on the member between the center and the circumference thereof to define an equal number of pole centers, each pole center being of opposite polarity with respect to its next adjacent pole center neighbor, and said pole centers of each member being non-coincident with the pole centers of any other members; and commutating means, wherein the means providing magnetic flux paths comprise:

a first annulus mounted in the housing symmetrically about the shaft;

a first plurality of $n$ arcuate magnets symmetrically positioned on the first annulus such that each subtends a polar angle $x$;

a second annulus mounted in the housing symmetrically about the shaft; and a second plurality of $n$ arcuate magnets symmetrically positioned on the second annulus such that each subtends a polar angle $y$, the said first plurality of arcuate magnets being aligned with the said second plurality of arcuate magnets in respective north pole to south pole facing relation, wherein polar angle $x$ is greater than polar angle $y$.

19. An electromechanical energy converter comprising:

a housing;

a shaft rotatably journaled in the housing; and means providing magnetic flux paths annularly disposed with respect to the shaft, which comprises:

a first annulus mounted in the housing symmetrically about the shaft;

a first plurality of $n$ arcuate magnets symmetrically positioned on the first annulus such that each subtends a polar angle $x$;

a second annulus mounted in the housing symmetrically about the shaft; and a second plurality of $n$ arcuate magnets symmetrically positioned on the second annulus such that each subtends a polar angle $y$, the said first plurality of arcuate magnets being aligned with the said second plurality of arcuate magnets in respective north pole to south pole facing relation, wherein polar angle $x$ is greater than polar angle $y$.

References Cited in the file of this patent

UNITED STATES PATENTS

| | | |
|---|---|---|
| 2,773,239 | Parker | Dec. 4, 1956 |
| 2,847,589 | Haydon | Aug. 12, 1958 |
| 2,970,238 | Swiggett | Jan. 31, 1961 |
| 3,023,335 | Burr | Feb. 27, 1962 |
| 3,054,011 | Silverscholtz et al. | Sept. 11, 1962 |

FOREIGN PATENTS

| | | |
|---|---|---|
| 1,160,490 | France | Mar. 3, 1958 |
| 1,226,720 | France | Feb. 29, 1960 |
| 1,248,645 | France | Nov. 14, 1960 |
| 1,249,849 | France | Nov. 28, 1960 |